May 20, 1930.  J. WOLKOFF  1,759,335
POWER TRANSMITTING DEVICE
Filed Nov. 30, 1927   3 Sheets-Sheet 1
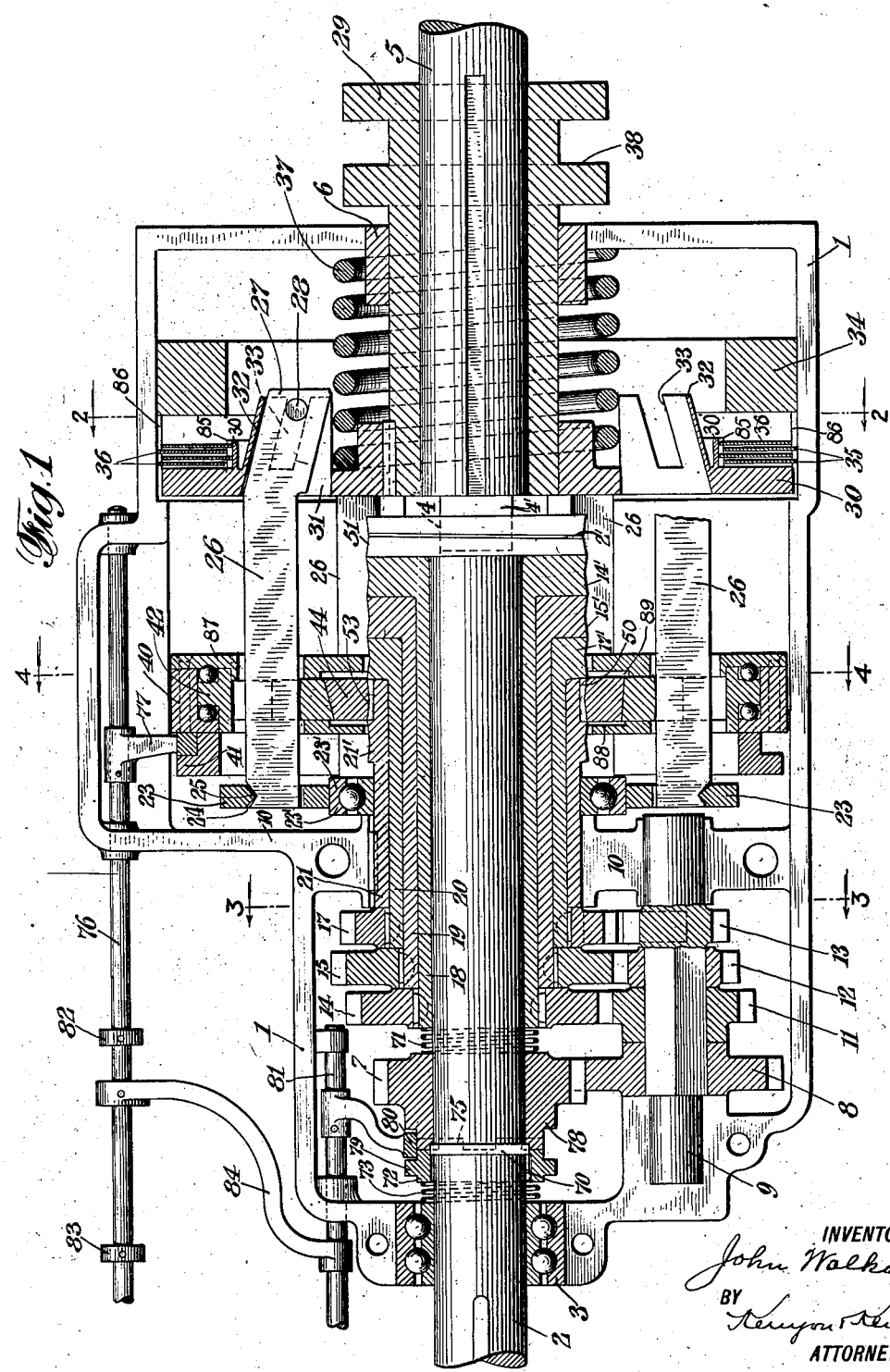
INVENTOR
John Wolkoff
BY
Kenyon & Kenyon
ATTORNEYS

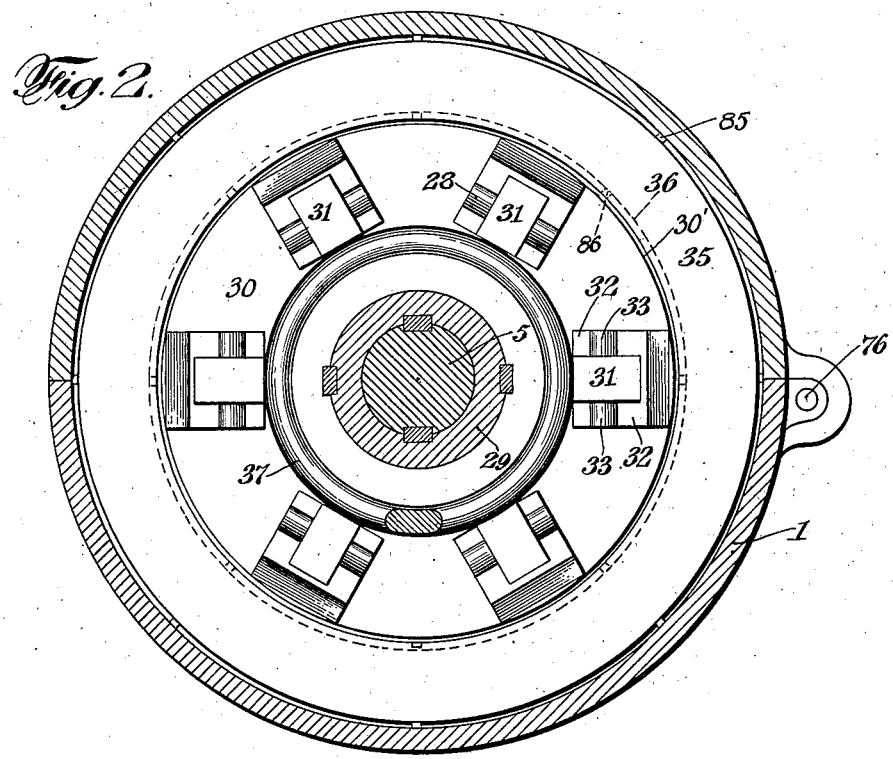
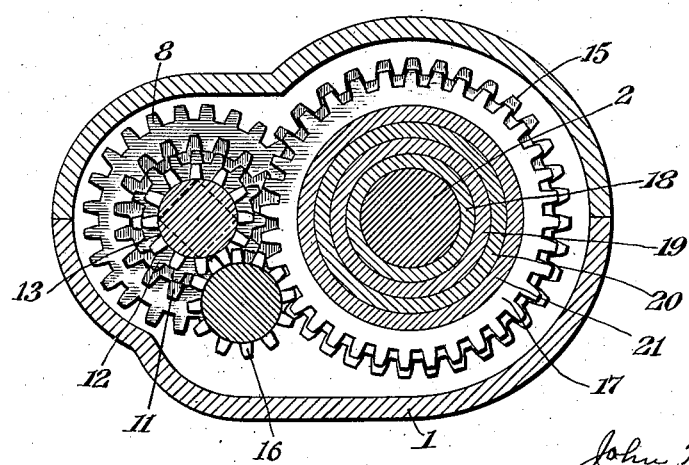

May 20, 1930. J. WOLKOFF 1,759,335
POWER TRANSMITTING DEVICE
Filed Nov. 30, 1927   3 Sheets-Sheet 3
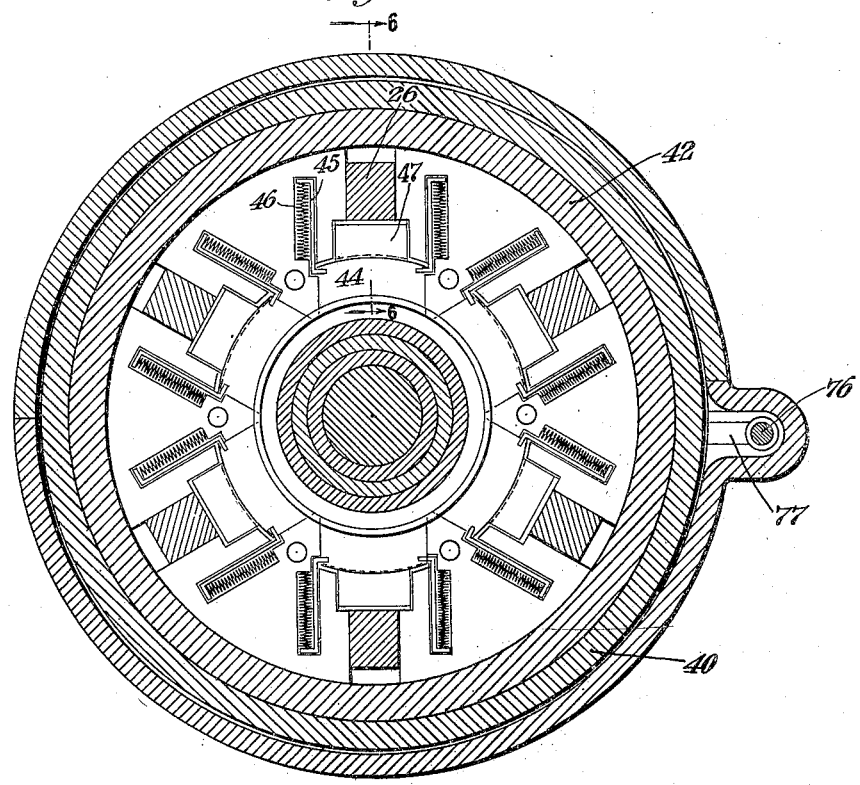
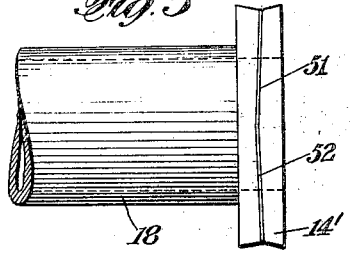
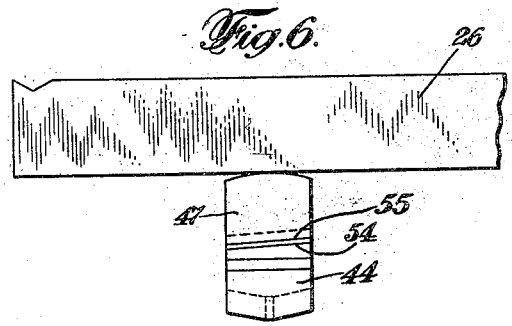
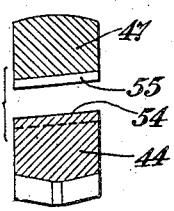
INVENTOR
John Wolkoff
BY Kenyon & Kenyon
ATTORNEYS Patented May 20, 1930

1,759,335

UNITED STATES PATENT OFFICE

JOHN WOLKOFF, OF NEWARK, NEW JERSEY

POWER-TRANSMITTING DEVICE

Application filed November 30, 1927. Serial No. 236,620.

My invention relates to power transmitting devices and particularly to speed changing mechanism which may be utilized in motor vehicles.

An object of my invention is to provide a power transmitting device which is capable of transmitting power at various speeds and which includes mechanism for selecting the speed at which the power is transmitted.

Another object of my invention is to provide a power transmitting device which includes a plurality of members operable at different speeds and clutching mechanism for selectively taking power from one of the members and transmitting it to a driven member, a further object being to provide a fixed member which may be engaged by the same clutching mechanism.

Another object of my invention is to include in a speed-changing device having clutching mechanism, a movable member for controlling the clutch and for effecting in addition a braking action.

Another object of my invention is to provide a power transmission unit capable of selectively transmitting power at different speeds and including a braking mechanism which may be set and a manually operated braking mechanism.

Another object of my invention is to provide a power transmitting device including parts operable at different speeds and a clutching device for connecting said parts with a finally driven member, the clutching device being so constructed that any tendency to slip will result in a firmer clutching action.

Another object of my invention is to provide a power transmitting device including parts driven at different speeds by a driving member together with means for connecting any one of such parts with a driven member and means for discontinuing the operation of some of the driven parts at a time when the driven member is connected to certain other driven parts.

Other and further objects and advantages of my invention will appear from the following description taken in connection with the drawings forming a part of the specification and to be pointed out in the appended claims.

In the drawings in which like reference characters indicate similar parts,

Fig. 1 is a longitudinal sectional view of a power transmitting device embodying my invention.

Fig. 2 is a sectional view on the line 2—2 of Fig. 1.

Fig. 3 is a sectional view on the line 3—3 of Fig. 1.

Fig. 4 is a sectional view on the line 4—4 of Fig. 1.

Fig. 5 is a detailed view of a gear carrying shaft.

Fig. 6 is a partial sectional view on the line 6—6 of Fig. 4.

Fig. 7 is a detailed view of the clutching members.

In the particular embodiment of my invention illustrated in Fig. 1 for the purpose of disclosing the manner of accomplishing the objects of my invention there is provided a casing 1 into which extends a driving shaft 2 supported at bearing 3 at one end of the casing and by partition 10, as hereinafter described and having a recess 4 within its end into which fits a projection 4' on the end of the finally driven shaft 5 which is in turn supported at bearing 6 at the other end of the casing. There is also mounted within the casing a jack shaft 9 which is supported by a bearing in the casing and another bearing in the partition 10. This shaft is squared and carries upon it the gears 8, 11, 12 and 13. Any of these gears, such as the gear 13, may be formed integral with the shaft. Mounted upon the driving shaft 2 are concentric sleeves or hollow shafts 18, 19, 20 and 21, the shaft or sleeve 18 carrying the gear 14 which meshes with the gear 11; the shaft 19 carrying the gear 15 which meshes with the gear 12 and the shaft 20 carrying the gear 17 which meshes with the gear 16 (see Fig. 3) which is in turn driven by the gear 13 in order to obtain a reverse direction of driving. The shaft 21 is keyed within the partition 10 and assists in supporting the other hollow shafts as well as the driving shaft 2. Fixed to the driving shaft 2 is a collar 70 against one side of which is pressed, by means of the spring 71, the gear 7 which is mounted for rotation upon the shaft 2. Pressed against the other side of the collar 70 by means of the spring 73 is collar 72. The collar 72 and the gear 7 have engaging faces formed with teeth 75. The collar 72 is splined upon the shaft 2 so that when the parts are in the position shown in Fig. 1 the driving shaft transmits motion through the gears 7 and 8 to the jack shaft 9 so that the shafts 18, 19 and 20 are driven at different speeds by reason of the proportions and the relative dimensions of the gears 11, 12, 13, 14, 15, 16 and 17.

Mounted directly upon the shaft 2 is the disk 2' which will move at the same speed as shaft 2. Mounted upon the shaft 18 is the disk 14' which will move at the same speed as gear 14. Mounted upon the shaft 19 is the disk 15' which will move at the same speed as the gear 15. Mounted upon the shaft 20 is the disk 17' which will have the same speed and direction of rotation as the gear 17. These disks are shown for convenience as being in contact with one another but while this form may be preferred, the particular relation is not essential. Upon the shaft 21 is mounted the disk 21' which will be held stationary. The disk 21' is spaced from the disk 17' so as to leave between the two disks a groove 50 which constitutes, as hereinafter described, the neutral groove.

The disk 23 is mounted upon hollow shaft 21 by means of the ball bearing 23'. This disk has a plurality of radially extending openings 24 provided at their outer ends with knife edges 25. Closely fitting within these openings 24 are clamping members 26 which extend longitudinally of the driving shaft and have end-portions 27 inwardly inclined towards the axis of the driving shaft 2. These ends carry pins 28 which extend out on each side thereof. Splined upon driven shaft 5 is a sleeve 29 upon which is keyed the clutch operating plate 30 (see Fig. 2). The plate 30 is provided with a plurality of openings 31. Surrounding openings 31 are extensions 32. The sides of extensions 32 are provided with slots 33 which are inclined towards the axis of the power shafts and which carry within them the pins 28 of the clamping members 26. The members 26 fit closely between the sides of the extensions 32. It will thus be seen that the clamping members 26 are supported at one end in the plate 23 and at the other end in the plate 30 and that an axial movement of the plate 30 will cause the inwardly inclined slots 33 to act upon the pins 28 and spread or contract radially the clamping members 26 at one end thereof. Fixed within the casing is the brake ring 34 against which the plate 30 may be manually brought into contact so as to effect a braking action on the driven shaft 5. In order to increase the braking effect the rings 35 may be mounted on longitudinal ribs 85 on the interior of the casing 1 and the rings 36 fitting between the rings 35 may be carried upon a ring 30' and slide on ribs 86 thereon. Surrounding the driven shaft 5, and sleeve 29 is the clutch spring 37 normally tending to move the clutch operating plate 30 to the left in Fig. 1 so that the pins 28 will occupy the position shown in the slots 33 and the clamping members 26 will be normally pressed inwardly. A yoke groove 38 is provided on the sleeve 29 to accommodate a yoke (not shown) for operating the clutch actuating plate 30.

Positioned between plates 23 and 30 is a ring 40 provided with a grooved collar 41 which may be acted upon by an arm 77 to move the ring 40 axially. Supported inside of the ring 40 upon ball bearings is a clutch carrying ring 42 (see Fig. 4). Extending outwardly from the central opening in the plate 42 through which the driven members pass are radial openings which accommodate clutching members. The clutching shoes 44 occupy the innermost ends of the radial openings and are held in position by links 45 upon which act springs 46 which are positioned in recesses within plate 42, and which tend to move the clutch shoes radially outward. Contacting with the outer surface of the clutch shoes are pressure members 47 which are engaged by the clamping members 26. It will now be apparent that the speed disks 2', 14', 15' and 17' are driven at different speeds from the driving shaft 2 through the gears 7 and 8 and 11 to 17. The clutch operating plate 30 is moved to the right in Fig. 1 and the inwardly inclined slots 33 carried by the plate will act upon pins 28 and spread the clamping members 26 so that the springs 46 can withdraw the clutch shoes from any given disk. By means of the grooved ring 41, the clutch bearing plate 42 may be moved so that the clutch shoes will occupy a position radially outwardly from any of the disks 2', 14', 15', 17' and 21', or radially opposite the neutral groove 50. Then when the clutch operating plate 30 is released the clutch shoes will engage the disk which they are radially opposite and the desired speed will be transmitted through the clamping arms 26 to the clutch operating plate 30 and thence to the driven shaft 5. If the clutch shoes engage the disk 2', the driving is direct. If the clutch shoes engage the fixed brake disk 21' the driven member 5 will be held against motion while the driving shaft is idle or in rotation. If the brake shoes 40 are positioned in the neutral groove 50 the driving shaft may be moved but no movement will be transmitted to the driven shaft 5. A manual braking effect is given to the driven shaft by movement of the clutch operating plate 30 to the right until the fixed ring 34 is engaged, as above described.

In order that the clutch device including the disks 23, 42, and 30, together with the parts carried thereby, and the clamping members 26 may be made effective to firmly grasp any of the speed disks or the braking disks 21', each disk is made with a groove 51 on one side which is helically inclined so as to provide in effect a left hand thread and a groove 52 on the other side which is helically inclined to provide in effect a right hand thread (see Fig. 5). In addition, each brake shoe has its contacting surface provided with a ridge 53 which fits into the groove 51 or 52. Then the upper face of each clutch shoe is inclined at 54 and the lower face of each member 47 is similarly inclined at 55. The operation of these details is as follows: If the clutch shoes do not firmly grip any of the disks 2', 14' etc. there will be a rotation of the disk relatively to the clutch shoes engaging it and the threads upon the speed disks will cause a movement of the clutch shoes axially to the right or to the left according to which thread is engaged by the particular shoes. This movement causes a wedging action between the inclined surfaces 54 and 55 with the result that the clutch shoes will be more tightly wedged against the speed disks. The clutch shoes are equidistantly spaced around the clutch-carrying disk 42 and alternate shoes have their outer surfaces respectively inclined in opposite directions so that no matter whether the clutch shoes engage a right hand thread or left hand thread of the speed disk there will surely be a wedging action produced by at least one-half of the shoes moved axially, if there is any axial movement of the clutch shoes due to a relative movement between them and the disk engaged by them. The clutch shoes are of slightly less width than the thickness of the plate 42 so as to permit the axial movement above described.

In order to shift the clutch disk 42 a rod 76 may be mounted to slide longitudinally in the casing and an arm 77 may be secured to the rod 76 and positioned within the groove in the collar 41.

Now it will be apparent that when the clutch shoes 44 engage the disk 2' at which time the driven member will be driven directly or at the same speed as the driving member and when the clutch shoes engage the fixed disk 21' there will be no necessity of driving the various speed disks 14', 15' and 17' and all the gear sets which operate them and therefore, I provide means for discontinuing the operation of the unnecessary speed disks. To this end, I provide on the hub of the gear 7 an extension 78 and upon the collar 72 an extension 79 and positioned between these two extensions, 78 and 79, an arm 80 carried by a rod 81 slidably mounted in the casing. Upon the rod 76 I place collars 82 and 83 and upon the shaft 81 there is an arm 84 which has a portion surrounding the rod 76 between the collars 82 and 83. The collars 82 and 83 are so positioned that when the rod 76 is respectively moved to position to bring the clutch member over the fixed disk and over the high speed disk the arm 80 will press against the extension 78 or 79 pressing back either the gear 7 against its spring 71 or the clutch collar 72 against its spring 73 and disengage the teeth 75 so that the gear 7 is disconnected from the shaft 2 and the gearing will no longer be driven and the operation of the speed disks will be discontinued. It will be apparent that the collar 70 on the shaft 2 limits the motion of the collar 72 and the gear 7 under the action of their respective springs so that either the gear 7 or the collar 72 may be pressed back to disconnect the teeth 75.

While I have described specific means for rotating the speed disks at various speeds and have given a detailed description of one construction of a clutching device, it is understood that I am not limited by these details or other details of the construction described but that my invention is defined by the hereunto appended claims.

Having thus described my invention, what I claim as new and desire to secure by Letters Patent is:

1. In a speed change device, a driving member, a driven member, a plurality of parts driven at different speeds by said driving member and a clutching device including a clutch having a radially movable part for engaging said driving parts, a longitudinal member fixed radially at one end and movable radially at its other end and engaging said radially moving clutch part and an axially movable part connected to said driven member for moving radially said other end of said longitudinal member.

2. In a speed change device, a driving member, a driven member, a plurality of parts driven at different speeds by said driving member, and a clutching device including a clutch having a radially movable part for engaging said driven parts, a longitudinal member fixed radially at one end and movable radially at its other end and engaging said radially moving clutch part, an axially movable part connected to said driven member for moving radially said other end of said longitudinal member and means for moving said radially movable clutch part longitudinally to positions to engage different ones of said plurality of parts driven at different speeds.

3. In a power transmitting device, a driving member, a driven member, a plurality of disks driven at different speeds by said driving member and having an inclined surface on the periphery thereof, a clutch shoe adjustable to engage any one of said disks, a member engaging said shoe, said shoe and member having inclined engaging surfaces whereby relative movement between said disk and shoe produces a wedging action and means connected to said driven member for pressing said shoe against said disk and transmitting power from said disk to said driven member.

4. In a power transmitting device, a driving member, a driven member, a plurality of parts driven at different speeds by said driving member, two rotatable elements, a plate connected to said driven member, a member having one end supported in one of said elements and engaging said plate and clutching means carried by the other of said elements and engaged by said last named member, said last mentioned element being movable to position said clutching means relatively to said driven parts.

5. In a power transmitting device, a driving member, a driven member, a plurality of parts driven at different speeds by said driving member, two rotatable elements, a plate connected to said driven member, a member having one end supported in one of said elements and engaging said plate, one of the engaging surfaces being inclined, and clutching means carried by the other of said elements and engaged by said last named member, said last mentioned element being movable to position said clutching means relatively to said driven parts, and said plate being movable to cause said inclined surface to move said last named member relatively to said clutching means.

In testimony whereof, I have signed my name to this specification.

JOHN WOLKOFF.